United States Patent [19]

Plura

[11] 4,043,833
[45] Aug. 23, 1977

[54] METHOD OF AND DEVICE FOR CLEANING THE SLOT-LIKE OPENINGS OF DISTRIBUTION AND COLLECTION PIPES IN AN ION EXCHANGER COLUMN

[75] Inventor: Georg Plura, Bergnestadt, Germany

[73] Assignee: L. & C. Steinmüller GmbH, Gummersbach, Germany

[21] Appl. No.: 650,898

[22] Filed: Jan. 21, 1976

[30] Foreign Application Priority Data
Jan. 23, 1975 Germany .............................. 2502607

[51] Int. Cl.² ................................................ B08B 3/00
[52] U.S. Cl. ........................................ 134/34; 134/111
[58] Field of Search .................. 134/34, 109, 110, 111

[56] References Cited
U.S. PATENT DOCUMENTS

| 2,742,381 | 6/1976 | Weiss et al. ........................ 134/34 X |
| 3,092,515 | 6/1976 | Pike et al. ........................... 134/34 X |

*Primary Examiner*—Arthur D. Kellogg
*Attorney, Agent, or Firm*—Walter Becker

[57] ABSTRACT

A method of and device for cleaning the slot-like openings of distribution and collection pipes of a continuously operating ion exchanger column. During the treatment phase, the ion exchange particles within the ion exchanger bed do not exchange places, and the bed has an axial movement without temporal interruption. The medium stream which flows through the distribution and collection pipes undergoes a flow reversal for a limited time in periodic succession with initial reduction of the rate of flow.

4 Claims, 1 Drawing Figure

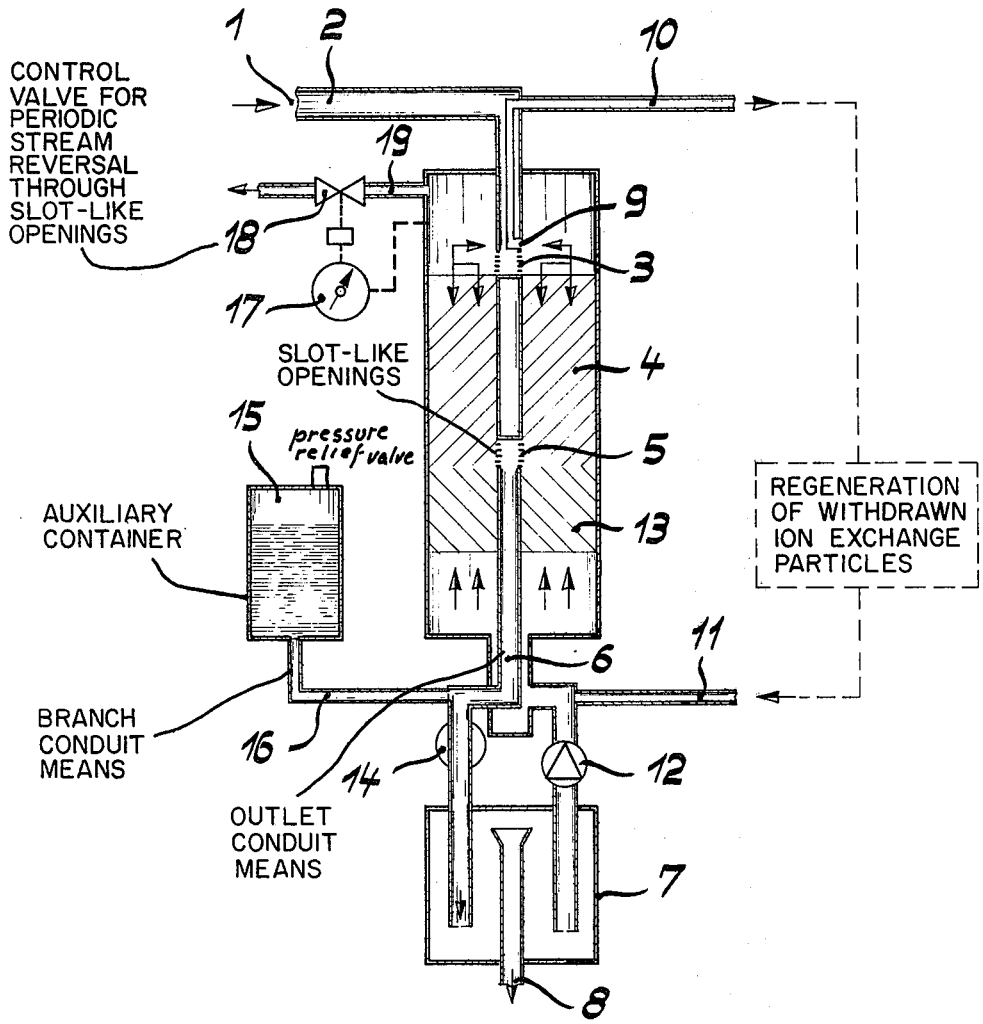

METHOD OF AND DEVICE FOR CLEANING THE SLOT-LIKE OPENINGS OF DISTRIBUTION AND COLLECTION PIPES IN AN ION EXCHANGER COLUMN

The present invention relates to a method of cleaning the slot-like openings of distribution and collection pipes of a continuously operating ion exchanger column, according to which the ion exchange particles within the ion exchanger bed during the treatment phase are not subjected to a mutual transposition or exchange of place, and the bed, during the treatment phase, has an axial movement without temporal interruption.

With the known continuous ion exchange methods utilizing a compact suspended bed, there has up to now been the drawback that the slot-like openings of the distribution and collection pipes have become blocked as a result of the mutually ground off material of the ion exchange resin and the sediments found in the fluid to be treated, and the arrangement or apparatus no longer produces the required efficiency.

It is an object of the present invention to develop a method whereby it will be possible to reliably flush clean the slot-like openings in the distribution and collection pipes, without thereby affecting the economy of the dominant continuous process.

This object and other objects and advantages of the present invention will appear more clearly from the following specification in connection with the accompanying drawing which shows a flow diagram in an apparatus utilizing the method of the present invention.

This method is characterized primarily in that the medium stream, which flows through the distribution and collection pipes, undergoes a flow inversion or reversal for a limited time in periodic succession when the rate of through flow per unit of time begins to drop.

The crucial advantage of the present invention consists in that the slot-like openings may be flushed clean in a shock-like manner with little expenditure as to construction or the method of practicing the process, and without interrupting the operation of the process.

Referring now to the drawing in detail, the unrefined or untreated fluid stream 1 is conveyed through the conduit 2 and openings 3 to the bed section 4, where it is treated and then conveyed through the slot-like openings 5 and the conduit 6 out of the apparatus and into a storage container 7 and a conduit 8 which leads to the place of destination (not shown). The ion exchange particles which are to be regenerated are withdrawn from the device through the opening 9 and the conduit 10, are regenerated in an arrangement not shown in the drawing, and are reconveyed to the bed section 13 from below through the conduit 11 means of the pump 12. These particles are slowly transported upwardly due to the pressure differential in the individual bed sections, without the individual particle being subjected to transposition within the bed.

By the mutually ground off material during the natural frictional interaction of the ion exchange particles, the sediments found in the untreated fluid stream, and by the suspended matter, the slot-like openings 5 become blocked after a while, so that the throughput of the finished fluid decreases and the pressure in the conduit 2 increases. To shock clean the openings 5, the valve 14 arranged in the conduit 6 is closed, causing the pressure in the ion exchanger column to increase for a short period of time, at the same time compressing the air in the vessel 15 through the conduit 16. The pump 12 continues to run the entire time. As soon as the pressure gauge or switch 17 in the upper portion of the device reaches the control value (rated value), the valve 18, which is connected with the device through the conduit 19, is instantaneously i.e., suddenly, opened.

During this lightning quick shock process, the fluid which has collected in the vessel 15 becomes effective in a direction counter to the normal flow direction by means of the compressed air above the fluid, through the conduits 16, 6 against the openings 5, rinsing the latter free. At the same time, an upward flow results which transports the ground-off material, which has been rinsed free, as well as the sediments, in the direction toward the upper section of the bed section 4. At the instant the valve 18 opens, with the valve 14 closed, the pump 12 in full operation, and the untreated fluid stream 1 flowing, all three fluid streams — the untreated fluid stream 1, the fluid stream from the vessel 15, and the fluid stream coming from the pump 12 and acting upon the bed 13 from below — are conveyed in the direction toward the valve 18; at the same time the ion exchanger column is transported along. The time periods during which the valve 18 is open are so short that the operation of the arrangement is not noticeably interrupted, and no changeover of the bed is effected.

It is also possible pursuant to the present invention to use a pump or other pressure auxiliary means instead of the vessel 15. It is further possible to use the method according to the present invention with fluidized beds and whirl beds as well as for mechanical filtrations.

It is, of course, to be understood that the present invention is, by no means, limited to the specific showing in the drawing, but also comprises any modifications within the scope of the appended claims.

What I claim is:

1. A method of cleaning the periodically blocked slot-like openings of distribution and collection pipes of a continuously operating ion exchange column in which the ion exchange particles during the treatment phase of a medium stream conveyed to an ion exchange bed in said column do not change places, and in which said bed during said treatment phase carries out an axial movement without temporal interruption, which includes the steps of continuing to convey said medium stream into said column, and through said bed and through slot-like openings to an outlet conduit, and when the through-flow per time unit decreases, applying fluid under pressure from an external source to said outlet conduit and openings to create flow under pressure opposed to said medium stream and subjecting said medium stream to periodic short time flow reversals to shock clean said slot-like openings while releasing the pressure of said medium stream on said bed in said column, during said subjecting said medium stream to periodic short time flow reversals the ion exchange particles being not subject to any space change during the flow reversal within the ion exchanger bed.

2. In combination: a housing adapted to receive an ion exchange bed, inlet conduit means leading into the upper portion of said housing and provided with first opening means for conveying an untreated medium stream into a section of an ion exchange bed inserted in said housing, outlet conduit means provided with slot-like opening means for receiving from said bed treated medium stream, a storage container, first conduit means including a shut-off valve interposed therein and leading from said outlet conduit means to said storage container, second conduit means leading from said storage container into said housing and including a pump interposed in said second conduit means, said storage container also having an outlet adapted selectively to be opened and closed, a closed auxiliary container having a gaseous atmosphere therein, branch conduit means branching off from said outlet conduit means upstream of said shut-off valve and also leading into said auxiliary container for conveying medium from said outlet conduit means into said auxiliary container and compressing said gaseous atmosphere therein, and control means including a control valve communicating with the interior of the upper portion of said housing above a bed in said housing and adapted when open to vent said medium from said housing, said control means also including gauge means operatively connected with said control valve to cause said control valve to open in response to pressure in said upper portion of said housing above a set pressure, thereby controlling brief reversal of medium stream flowing through said slot-like openings to shock clean said slot-like openings.

3. A method of cleaning the periodically blocked slot-like openings of distribution and collection pipes of a continuously operating ion exchange column in which the ion exchange particles during the treatment phase of a medium stream conveyed to the upper portion of a housing above an ion exchange bed in said column do not exchange places, and in which said bed during said treatment phase carries out an axial movement, said liquid passing through said bed to slot-like inlet openings in an outlet pipe and into a storage chamber, ion exchange particles are circulated to be regenerated from said upper portion and the regenerated particles are conveyed to the bottom of said housing below said bed, and liquid is pumped from said storage chamber into the bottom of said housing and upwardly in said bed, the method comprising shutting off said outlet pipe and conveying the fluid under pressure from said outlet pipe to a closed auxiliary vessel, compressing a gaseous atmosphere in said vessel, and venting said upper portion of said housing above said bed upon raising of the pressure in said portion, said liquid under pressure in said auxiliary vessel flowing in reverse direction in said outlet pipe to cause flow in the reverse direction through said slot-like openings to clean said openings.

4. A continuously operating ion exchange column comprising a housing, an ion exchange bed in said housing, inlet conduit means leading into the upper portion of said housing above said bed, an outlet pipe leading to a liquid storage chamber and having slot-like inlet openings below the upper surface of said bed and a shut-off valve in said outlet pipe, an outlet pipe from said upper portion to convey ion exchange particles to be regenerated and an inlet pipe opening into said housing below said bed to reconvey said regenerated particles to said housing below said bed, a conduit leading from said housing below said bed to said storage chamber and a pump in said conduit for pumping liquid from said storage chamber into the lower portion of said housing below said bed, said storage chamber having an outlet adapted to be opened and closed, an auxiliary closed vessel connected to said outlet pipe between said inlet openings and said shut-off valve to receive liquid from said outlet pipe with a compressed gaseous atmosphere above the liquid, and a pressure-controlled vent connected to the upper portion of said housing to vent said portion at a pressure above a set value, so that closing said shut-off valve creates pressure in said fluid, and said vent in said upper portion opens and fluid from said auxiliary vessel flows into said outlet pipe and through said slot-like openings into said bed and upper portion.

* * * * *